United States Patent [19]

Zahedi et al.

[11] 4,308,036
[45] Dec. 29, 1981

[54] FILTER APPARATUS AND METHOD FOR COLLECTING FLY ASH AND FINE DUST

[75] Inventors: Karim Zahedi, Brookline; Jeffrey C. Alexander, Reading, both of Mass.

[73] Assignee: EFB Inc., Woburn, Mass.

[21] Appl. No.: 69,046

[22] Filed: Aug. 23, 1979

[51] Int. Cl.³ .............................................. B03C 3/00
[52] U.S. Cl. ............................................ 55/6; 55/99; 55/131; 55/479; 55/154; 55/155; 55/112; 55/151; 55/126
[58] Field of Search ....................... 55/216, 79, 98, 99, 55/124, 126, 131, 136–138, 154, 151, 155, 112

[56] References Cited

U.S. PATENT DOCUMENTS

| | | | |
|---|---|---|---|
| 1,570,869 | 1/1926 | Thompson et al. | 55/99 |
| 3,926,587 | 12/1975 | Squires | 55/6 |
| 4,126,435 | 11/1978 | Reese | 55/474 |
| 4,142,873 | 3/1979 | Berz | 55/96 |
| 4,144,359 | 3/1979 | Zahedi et al. | 55/131 |
| 4,149,858 | 4/1979 | Noack et al. | 55/479 |

FOREIGN PATENT DOCUMENTS

| | | |
|---|---|---|
| 1457273 | 3/1969 | Fed. Rep. of Germany . |
| 2842718 | 4/1979 | Fed. Rep. of Germany ........ 55/131 |
| 2400941 | 4/1979 | France .................................. 55/479 |
| 216675 | 6/1924 | United Kingdom .................. 55/479 |

OTHER PUBLICATIONS

Electrified Filter Bed–Bowman & Associates Inc. Sales Rep for EFB pp. 1-28 d/d 1979.

Primary Examiner—Bernard Nozick
Attorney, Agent, or Firm—Shapiro and Shapiro

[57] ABSTRACT

Fly ash and fine dust in a gas stream from a coal combustor, for example, are efficiently collected in a 2-stage, tubular, granular bed filter. The stages of the filter are arranged one above the other so that the granules may move from the upper stage to the lower stage under the influence of gravity. Larger particulate in the gas stream is first collected by the lower stage, and then the remaining particulate is electrically charged and collected by the upper stage. Both stages are electrified sufficiently to rigidify the granular beds and adhere the particulate to the granules, so that the granules and the collected particulate move downwardly through the filters as a plug. Granules that exit from the lower stage are cleaned and returned to the upper stage. Non-porous granules may be used to prevent fine particulate from becoming embedded in the granules.

10 Claims, 4 Drawing Figures

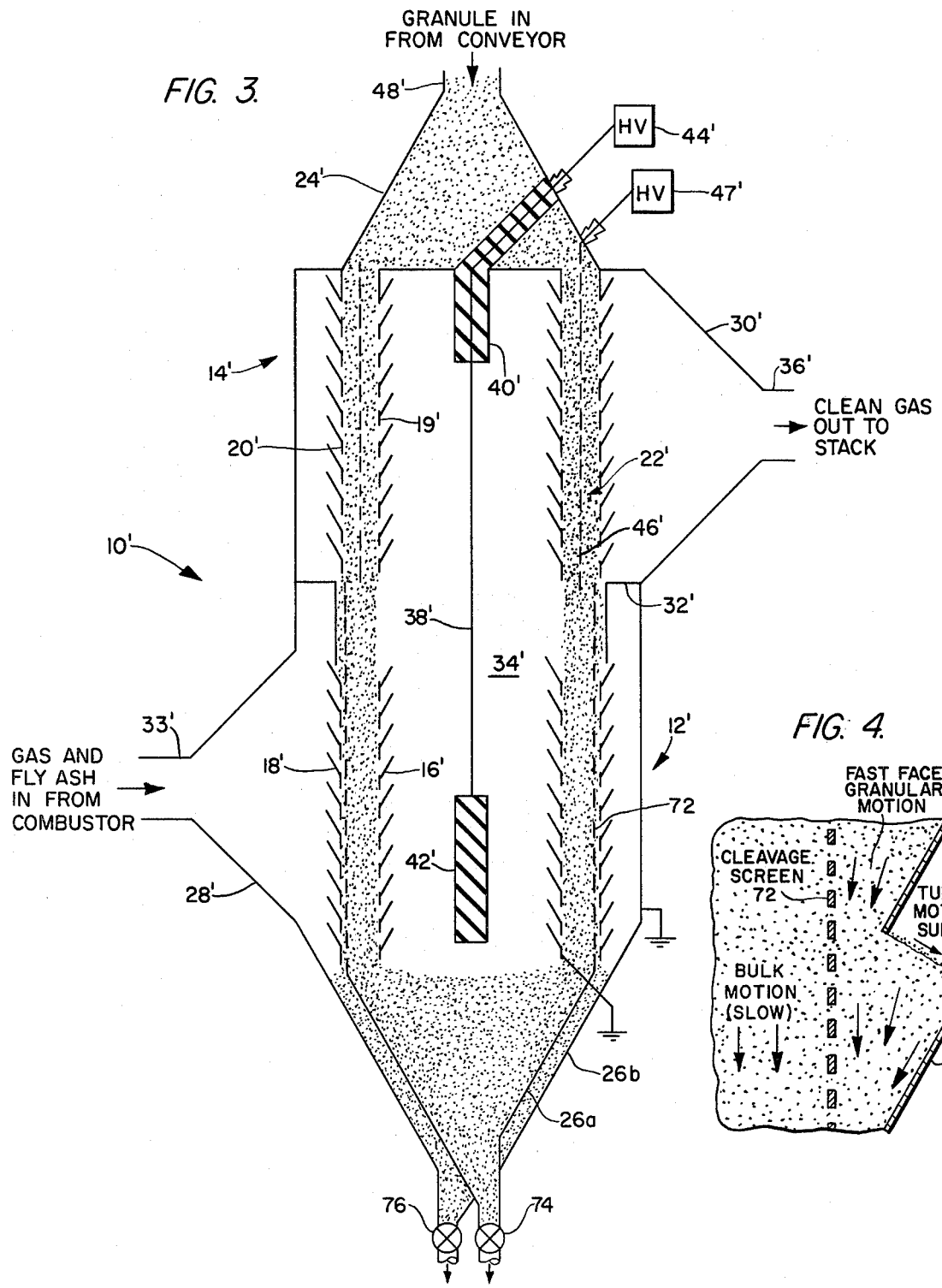

FILTER APPARATUS AND METHOD FOR COLLECTING FLY ASH AND FINE DUST

BACKGROUND OF THE INVENTION

This invention relates to the removal of particulate from a gas stream, and more particularly to the removal of fly ash and unburned carbon particle air pollutants from gases resulting from the combustion of coal.

Increasing coal usage and tightening environmental standards are forcing industry to improve air pollution control systems or to install them where they were not previously required. The problem of fly ash and unburned carbon particle air pollutants exists, for example, in may types of coal-fired boilers. Particulate emissions from coal-fired boilers are conventionally controlled by electrostatic precipitators, cyclones, scrubbers, and, more recently, baghouse filters. For various reasons, industry is seeking new particulate emission control technologies, with better economic and operational performance characteristics.

BRIEF DESCRIPTION OF THE INVENTION

The present invention employs granular bed filters, a class of apparatus that is generally well known, but that has been considered impractical for many industrial applications because of performance problems—including low particulate collection efficiencies; clogging of foraminous wall structures; re-entrainment of collected particulate; inefficient removal, cleaning and reuse of bed granules—and because of impractical structural configurations.

Accordingly, a principal object of the present invention is to provide a solution to the foregoing and other problems in granular bed filters.

A more general object of the invention is to provide improved filter apparatus and methods.

Briefly stated, in one of the broader aspects of the invention, granules of a filter bed move under the influence of gravity and are rigidified by a strong electrical field so that the granules and collected particulate move continuously downward as a plug. In another broad aspect, a gas stream passes through first and second tubular granular filter beds that are stacked one above the other. In another broad aspect, a gas stream passes inwardly through a first tubular filter bed, and then the remaining particulate in the gas stream is charged electrically and the gas stream passes outwardly through a second tubular filter bed. In a further broad aspect of the invention, a foraminous cleavage member is employed in a granular filter bed to provide separate regions of fast and slow granule movement. In still another aspect of the invention, non-porous granules are used in a granular filter bed, removed, cleaned, and returned to the bed.

BRIEF DESCRIPTION OF THE DRAWINGS

The invention will be further described in conjunction with the accompanying drawings, which illustrate preferred and exemplary embodiments, and wherein.

FIG. 2 is an explanatory diagram;

FIG. 3 is a diagrammatic vertical sectional view of a second embodiment of the invention; and FIG. 4 is a further explanatory diagram.

DETAILED DESCRIPTION OF THE PREFERRED EMBODIMENTS

Figure 1:
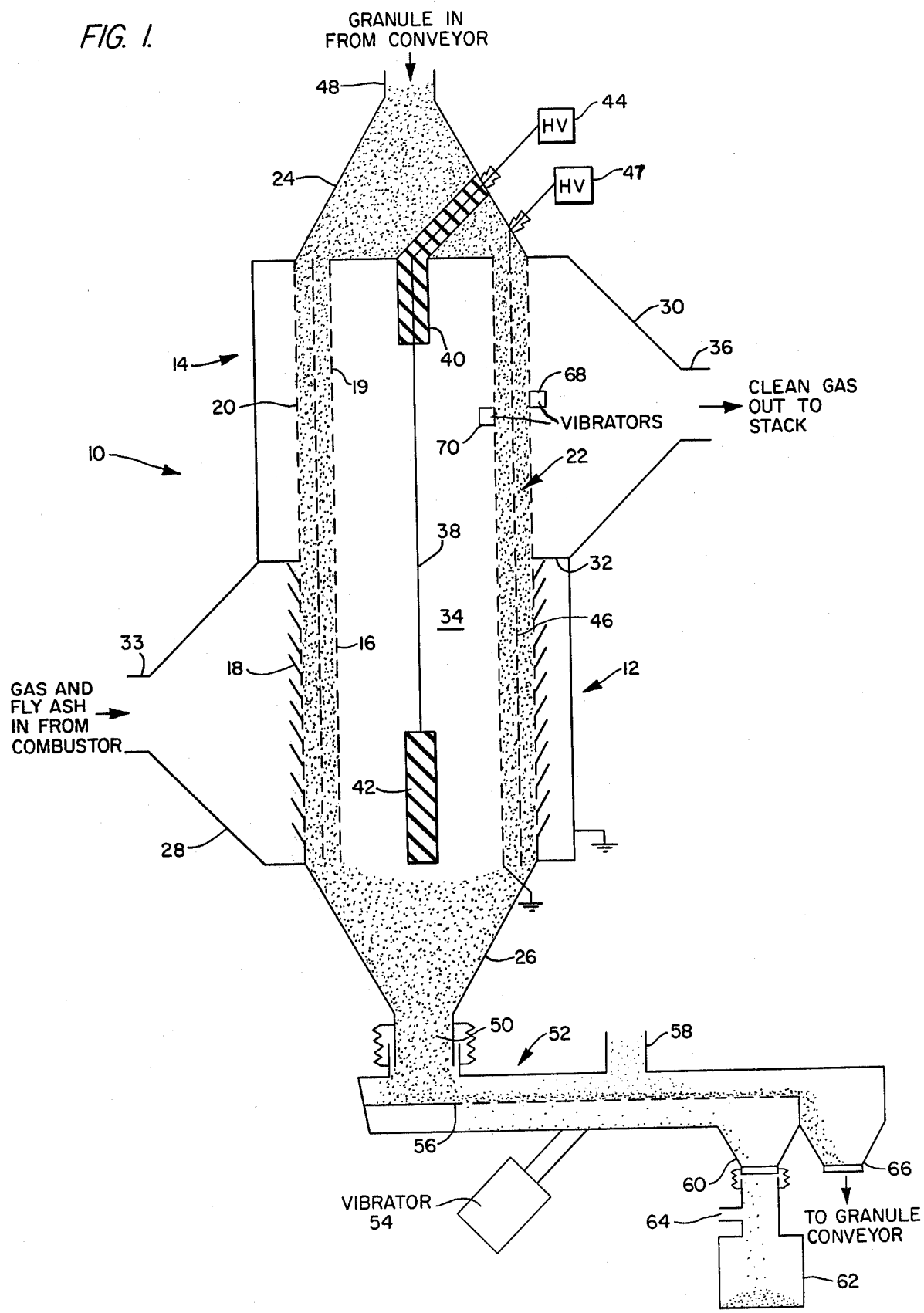
FIG. 1 is a diagrammatic vertical sectional view of a first embodiment of the invention.

The present invention is concerned with granular bed filters, more particularly electrified filter beds, although some features of the invention have broader applications. As is generally known, an electrified filter bed may comprise a shallow bed of insulating or semi-insulating granules. When the granules are retained between vertical foraminous walls, such as screens, perforated plates, etc., and a gas stream is passed through the filter bed horizontally, the filter may be termed a packed bed or panel bed filter. A high electric voltage is applied across the bed, and the voltage gradient electrically polarizes the granules in the bed, inducing oppositely positioned caps of positive and negative charge on the granules. With insulating granules, no steady electric current flows; otherwise a steady electric current may be drawn, but this will not impede the polarization process so long as the high voltage can be maintained Before passing through the electrified filter bed, particulate in the gas stream is electrically charged by passing the gas stream through a corona discharge device, for example. Once in the bed, the charged particulate is attracted to the oppositely charged caps on the granular material, resulting in separation of the particulate from the gas stream. The cleaned gas continues through the bed. Very high particulate collection efficiencies are theoretically possible, by virtue of the immense collection surface available in the granular bed. However, after a relatively short time, the accumulated particulate in the granular bed must be removed. For economic reasons, the granules may be cleaned of the collected particulate and returned to the bed for further use. This may be accomplished by feeding granules removed from the filter bed to a cleaning device, such as a screen sifter or fluidized bed. The particulate removed from the granules may then be conveyed to a storage silo and the granules returned to the bed. In certain applications, granules coated with particulate (that may be at least partially in liquid form) may be used in manufacturing processes, as disclosed in U.S. Pat. No. 4,144,359, assigned to the same assignee as the present invention.

The use of electrified filter beds to control air pollution emissions from coal combustors has not been practical because of a number of problems, some of which will now be discussed.

1. In most applications fly ash produced by the burning of coal is a very dense dispersion (aerosol) of fine particles (micron sized or smaller) of high electrical resistivity. Such as aerosol is very difficult to charge in the usual corona chargers, yet electrical charging of the fine particles is required for efficient particulate collection. Increasing gas residence time in the charger might be effective, but then the charger would resemble a high cost electrostatic precipitator. Increasing the corona current intensity is not possible because of the high resistivity of the fly ash and the well known associated "back corona."

2. Several granular cleaning techniques have been proposed but have failed for a variety of reasons. In situ cleaning of a bed by reverse pulses of compressed air is difficult to control properly and is not very effective. Batch-dumping of the bed requires intricate baffling and damper systems that are unacceptable to industry. Continuous draining of the bed results in agitation in the bed that dislodges and re-entrains fly ash in the gas flow, thus reducing removal efficiencies.

3. Foraminous bed retaining walls become clogged, necessitating frequent, difficult maintenance. Rapid continuous draining of the bed alleviates the problem but is inefficient.

4. Periodically, because of irregularities in the coal combustion process, large amounts of unburned carbon particulate are emitted into the gas stream. These get collected in the bed and cause excessive current drain from the power supply because of the carbon's low electrical resistivity.

The present invention solves these and other problems that have prevented the practical utilization of electrified filter beds in the environment described. First, the invention employs a preliminary filter stage that removes up to 90% of the particulate matter by mechanical filtration mechanisms, so that the remaining fine particulate can be charged by conventional corona technology without overloading the charger. Second, the invention employs continuous gravitational removal of the bed granules in a manner that prevents re-entrainment of collected particulate. Third, the invention employs multi-layered removal of granules at different rates to minimize the clogging of bed retaining walls while utilizing bed granules efficiently. Fourth, granules with non-porous surfaces are employed to prevent carbon build-up in surface pores, so that the granules may be readily cleaned and reused. Finally, the invention employs a unique structural configuration that greatly facilitates the practical employment of electrified filter beds in industrial applications.

The invention will be described in its application to the control of air pollutant emissions from coal combustors, but the invention has broader applicability, particularly in the utilization of certain features of the invention alone or in different combinations.

Referring now to FIG. 1 of the drawings, the preferred embodiment employs a unique 2-stage, tubular filter 10 including a first stage 12 and a second stage 14 arranged in series vertically. The lower stage 12 has inner and outer foraminous walls or tubes 16 and 18, respectively, and the upper stage has inner and outer foraminous walls or tubes 19 and 20, respectively. As shown, the inner walls 16 and 19 of the two stages of the filter may be constituted by a single continuous member.

In the preferred embodiment, the inner and outer walls of each filter are coaxial cylinders with their axis arranged vertically. The cylinders are separated by 2 to 6 inches, for example, to define a space which receives a bed of granules 22 (which may range from 20 to 4 mesh, for example). The inner and outer cylinders may have diameters, respectively, of 28 inches and 36 inches, for example. In the preferred form, the tubular granular beds of the upper and lower stages are aligned to constitute portions of one continuous bed extending from an upper granule input funnel 24 to a lower granule removal funnel 26.

Walls 16, 18, 19, and 20 serve as retaining walls for the filter beds and may be screens or perforated metal plates with a hole size nominally $\frac{1}{8}$ inch, for example. Retaining wall 18 of the lower filter is preferably a louvered structure which may comprise a stack of units, each having an upper conical funnel portion and a lower cylindrical portion, with the units attached to spacers or stringers to define openings (e.g., 1 inch high) between the units. The louvers may slope upwardly and outwardly at about 60° from horizontal and may be spaced about 3-4 inches apart. The length of the louvers is determined by the angle of repose of the granules and is sufficient to prevent spillage of the granules.

One of the problems normally associated with granule bed filters is the plugging or clogging of filter bed retaining members, which lose their gas permeability. The louvered plate structure 18 provides wide spaces where densely fly ash laden gas impinges directly onto bed granules, so as to reduce clogging. Because the granules are continuously moving downward (as will be described later in detail), the incident surface of the bed is continuously being renewed, thus further reducing clogging by the collected particulate. Perforated retaining plates 16, 19 and 20 may be employed in regions where the fly ash loading is not as great. They are preferably perforated with holes of diameter such that at about 10-20% of the granules are small enough to fit through the holes. As an example, granules for use in the bed may be screened to be between 1/10 inch and $\frac{1}{4}$ inch in diameter. $\frac{1}{8}$ inch perforations allow granules between 1/10 inch and $\frac{1}{8}$ inch to pass through. This plate construction allows "bleeding" of some granules through the plates and reduces plugging by other granules or fly ash. In order for the plates to bleed effectively, vibrator units 68 and 70 may provide periodic vibration of the retaining plates. These units need only be activated for a few seconds every several hours. The vibrations cause granules which just "sit" in the perforations to fall out.

The lower filter is surrounded by an input plenum or manifold 28, while the upper filter is surrounded by an exhaust plenum or manifold 30, the manifolds being separated by a horizontal wall 32 and constituting a housing surrounding the 2-stage filter. The gas stream supplied to inlet 33 from a coal combustor, for example, and containing fly ash and other particulate, passes inwardly through the granular bed of the lower filter to the interior space 34 of the filters and then passes outwardly through the upper filter to an outlet 36, which may be connected to a stack. Either a positive pressure blower or fan on the input side or an exhaust blower or fan on the output side of the 2-stage filter may be employed to move the gas stream through the filter apparatus.

The interior space 34 of the filters contains a charger such as a corona discharge electrode 38, which may be hung from an insulator 40 and which may be provided with a conventional vibrator or "rapper" (not shown). Corona charging devices are well known in the art, and many conventional types may be employed. Electrode 38 may be a $\frac{1}{8}$ inch square bar, for example, with a weight or insulator 42 at its lower end. High voltage, e.g., 50-100 KV (preferably negative DC, relative to ground) is applied from a power supply 44 to the charger electrode 38. The bed retaining walls and plenum structures are preferably grounded. An ion flux is thus directed from electrode 38 toward the grounded walls 16 and 19 and fills the region 34. Fine particulate matter in the gas stream passing from the preliminary filter stage 12 receives an electrical charge by impaction of ions from this flux.

Voltage gradients are applied to the filter beds by a cylindrical foraminous electrode 46 (e.g., with $\frac{1}{4}$ inch to $\frac{1}{2}$ inch holes) embedded in the filter beds and supported by insulators (not shown). A voltage of from 2 to 20 KV, for example (preferably DC, although AC may be used), is applied to this electrode from a high voltage supply 47. The resultant voltage gradient between electrode 46 and the grounded retaining walls of the filters provides electrostatic aerosol collection forces and serves another important purpose, which will be described shortly.

Clean granules are fed into the filter beds through an inlet port 48. An outlet port 50 may be equipped with a device, such as a vibratory feeder, for controlling the granule removal rate. As granules are removed from the lower bed, clean granules feed in through inlet port 48 and move down through the beds by gravitational action. Characteristic propagation velocities of the granules through the beds may be from 1–10 feet per hour, for example.

As the granules and collected particulate are fed out of the lower filter 12, the granules are preferably cleaned of collected particulate and returned to the filter beds for reuse. This may be accomplished by several mechanisms, such as screen sifters and fluidized beds. A preferred mechanism is depicted diagrammatically in FIG. 1. Granules and collected particulate are fed into a separator 52 through outlet port 50. A vibrator 54 provides for the smooth flow of granules over a screen 56 and provides agitation to dislodge fly ash and other particulate from the granules. The granule depth on the screen is preferably not more than a few granule diameters. Air is vented from the separator through port 58. The vented air carries away dust separated from the granules. Further, the updraft of air serves to eliminate plugging problems in the screen 56. The screen mesh size is determined by the size of granules desired in the filter beds. Typically, it may be 10 mesh. Any granules smaller than 10 mesh would then fall through the screen and exit the separator through port 60 to a storage container 62 having a vent 64. Cleaned granules of greater than 10 mesh pass over the screen and exit the separator through port 66 to a granule conveyor, such as a bucket elevator, which carries the cleaned granules to the top of the upper filter, where they may be discharged into a collection vessel which feeds the granules to inlet port 48. The vented air, densely laden with fly ash and dust passes to a conventional storage silo, bin vent unit.

In the operation of the filter apparatus of FIG. 1, polluted gas enters plenum 28 and passes horizontally through the filter bed of the lower filter 12. This bed collects large pollutant particulate by mechanical filtration mechanisms (which are quite efficient for larger particulate [supermicron] but not for small particulate [submicron]), and retains the collected particulate in the bed with the aid of electromechanical freezing forces in the bed, which will be described shortly. The gas exiting the first or preliminary filter is cleaned of approximately 90% of its particulate pollutants. The remainder is carried by the gas stream upward through region 34, where it is electrically charged by the corona discharge from electrode 38. Region 34 also acts as an electrostatic precipitator to remove some of the charged particulate from the gas and deposit it on the perforated plate 19, but it is not a large enough region to do so with high efficiency. After being charged, the particulate and its entraining gas pass horizontally through the final filter bed of filter 10, where electrostatic collection forces clean the particulate from the gas with ultra-high efficiencies while electromechanical freezing forces augment its retention in the bed. Finally, the cleaned gas exits the filter apparatus through plenum 30.

As alluded to earlier, the high voltage on electrode 46 has an important purpose in addition to providing electrostatic collection forces for the upper filter. When a large electric field ($E_o$) is applied to a bed of granules or particles g, as shown in FIG. 2, large inter-particle forces are electrically induced in the direction of the electric field. Such forces are a function of the contact area between particles and can be written as:

$$fe = \frac{(.4)4\pi\epsilon_o R^2 \left(\frac{R}{R_C}\right)^2 E_o^2}{\ln^2\left(\frac{R_C}{2R}\right)}$$

where $f_e$=electromechanical force
R=bed particle radius
$R_C$=contact radius
$E_o$=electric field intensity
$\epsilon_o$=permittivity of free space These forces can be large enough to completely support a granular bed between sets of vertical parallel plates, for example. A large electromechanical chaining effect is caused by the concentration of electric field near the inter-particle contact points. These large electric fields are the result of constrictions of the current paths at the contact points. It can be shown that the electric field around the contact area is several orders of magnitude larger than the ambient electric field (i.e., the applied voltage divided by the distance between the electrodes). A field intensity of about $5\times10^5$ volts per meter (close to the electrical breakdown strength of the bed) has been found to be effective to "freeze" or rigidify the bed. A field intensity of the order of $10^5$ volts per meter appears to be required. If the field intensity is too high, say $3\times10^6$ volts per meter, undesirable ionization and bed breakdown will occur.

In the present invention, the electromechanical chaining effect is used to rigidify the bed and also to achieve stable adhesion of the fly ash and other fine particulate to the bed granules. The large electric fields (an order of magnitude larger than needed for electrical enhancement of collision of fly ash with bed granules) serves to improve the adherence of the ash to the bed granules. This applies to both submicron and supermicron ash which may have contacted the bed granules by either inertial impaction or electrostatic attraction. The collected ash a becomes part of the electromechanical chain as shown in FIG. 2. As the granule bed moves downwardly between the retaining walls of the filters toward the outlet funnel, the strong electric field forces the granules to move as a substantially solid plug, the plug being formed by chains of the bed granules. As a result, the grinding effect between particles that is normally characteristic of moving beds is eliminated, and the chance of re-entrainment of the collected ash and other fine particulate is drastically reduced.

In summary, the strong electric fields employed in the invention affect the filtration process by forming chains of collected ash and bed granules which enhance the adhesion of the ash to the granules and which cause the bed to move downwardly toward the outlet funnel as a plug. The usual individual bed granule motion is replaced by the motion of chains of granules between the retaining walls. To achieve maximum retention of the ash inside the bed while the bed is being moved, external mechanical disturbances should be minimized while the electromechanical chains move gently between the retaining walls.

Conventional bed granules, such as gravel, sand, limestone, etc., have a porous surface structure. Upon repeated collection of unburned carbon particulate, the carbon becomes embedded in the granule pores. The granules cannot then be effectively cleaned of the carbon, and the carbon build-up results in excessive current requirements for the electrified filter bed. It has been discovered that by using granules with a non-porous, preferably smooth surface structure in which the carbon particulate cannot become embedded, the collected carbon can be effectively cleaned from the granules. This has been successfully demonstrated using glass granules, such as glass beads or crushed glass (cullet) in circumstances where ordinary gravel failed because of carbon build-up in the surface pores. Current requirements were 100 times more for the gravel than for the glass granules. Crushed glass is especially suitable because it is inexpensive and readily available.

In the structure illustrated in FIG. 1, a louvered inlet plate 18 is employed to minimize the problem of plugging of foraminous retaining walls. It has been found that when inlet loadings of dust are high and/or when the dust is of a sticky nature, granules in the inlet louver region can plug the louver openings and become frozen in the louvers. Eventually, the permeability to gas is lost. This problem can be remedied, as is already known, by faster motion of the granules through the bed, but faster motion leads to increased re-entrainment of collected dust and to poor utilization of the granules. In addition, the capacity of granule handling equipment must be increased several times.

In accordance with the invention it has been discovered how to employ fast granule movement without the disadvantages just described. More particularly, it has been discovered that the desired results can be achieved by employing a coarse "cleavage" screen (screen openings much larger than the granule size) a small distance behind the inlet louvers (approximately 1 inch behind, for example, for overall bed depths of about 4 inches to 6 inches). Two solid feeding funnels below the cylindrical filter bed allow separate control of feed rates in front of and behind the screen. The screen creates a cleavage surface in the bed, and the granules in the front face can be moved at a greater velocity than in the bulk of the bed. The screen allows gas passage but does not plug, because of the constant granule motion at its surface and some granule motion through it. To this end, the screen is of a mesh size greater than the granule size. For example, a screen with at least ½ inch openings may be employed for granules of about ⅛ inch diameter.

FIG. 3 illustrates a second embodiment of the invention employing the feature just described. Parts corresponding to those shown in FIG. 1 are designated by corresponding primed reference numerals. In this embodiment, all of the retaining walls are louvered to minimize clogging, and, in addition, a cleavage screen 72 is employed in the lower filter unit close to the inlet retaining wall 18'. If the total depth of the filter bed between retaining walls 18' and 16' is 4 inches to 6 inches, for example, screen 72 may be spaced about 1 inch from retaining wall 18'. Separate outlet funnels 26a and 26b are provided, each controlled by a separate control valve 74 or 76. The control valves are adjusted so that the flow of granules between screen 72 and the inlet retaining wall 18' is much faster (at least several times faster) than the flow rate of granules in the remainder (the bulk) of the bed. For example, the fast rate may be 8 to 10 feet per hour, as compared to about 1 foot per hour for the slow rate. FIG. 4 illustrates diagrammatically the movement of the granules in the fast and slow zones, separated by the cleavage screen 72. Pre-filter 12' may not be electrified, in which event screen 72 may be grounded (or left "floating"). Screen 72 may also be used as a high voltage electrode for filter 12'.

While several preferred embodiments of the invention have been shown and described, it will be apparent to those skilled in the art that changes can be made in these embodiments without departing from the principles and spirit of the invention, the scope of which is defined in the appended claims. For example, a plurality of 2-stage filters in accordance with the invention may be arranged in parallel in a common housing to provide additional filter capacity. Instead of employing an electrode within the filter beds, a high voltage may be applied between opposite, insulated retaining walls of the bed.

What is claimed is:

1. Apparatus for removing particulate from a gas stream comprising a pair of foraminous walls separated to define a space for a bed of granules, the walls being oriented so that the granules may move from an upper region of the walls to a lower region of the walls under the influence of gravity, means for supplying granules to the upper region and means for removing granules from the lower region to provide a downwardly moving bed of granules, means for passing a gas stream containing particulate through the walls and the downwardly moving bed of granules, means defining electrodes between which the bed of granules moves and means for applying a high voltage across said electrodes producing an electrical field having a field intensity measured in volts per meter of sufficient magnitude to rigidify the bed and adhere the particulate to the bed granules so that the granules and the collected particulate move continuously downward as a plug.

2. Apparatus in accordance with claim 1, wherein an electric field of the order of $10^5$ volts per meter is applied to the electrodes.

3. Apparatus in accordance with claim 1, wherein the walls comprise inner and outer tubes defining a tubular space therebetween containing said bed.

4. Apparatus in accordance with claim 1, further comprising means for cleaning granules removed from the bed and means for returning cleaned granules to the bed.

5. Apparatus in accordance with claim 3, wherein the means for passing the gas stream defines a flow path through a lower portion of the bed into the outer tube and then through an upper portion of the bed and out of the outer tube.

6. Apparatus in accordance with claim 5, wherein means for electrically charging particulate in the gas stream is located inside the inner tube.

7. A method of removing particulate from a gas stream comprising providing a moving bed of granules that moves continuously downward from a first region to a second region between electrodes, supplying granules to the first region, removing granules from the second region, passing a gas stream containing particulate through the moving bed of granules, and applying a high voltage across the electrodes producing an electrical field having a field intensity measured in volts per meter of sufficient magnitude to rigidify the bed and adhere the particulate to the bed granules so that the granules and the collected particulate move continuously as a plug.

8. A method in accordance with claim 7, wherein an electric field of the order of $10^5$ volts per meter is applied to the bed.

9. A method in accordance with claim 7, further comprising cleaning granules removed from the bed and returning cleaned granules to the bed.

10. A method in accordance with claim 9, wherein the particulate comprises carbon particles, and wherein the granules have a non-porous surface in which the carbon particles cannot become embedded.

* * * * *